US007898939B2

(12) United States Patent
Lee et al.

(10) Patent No.: US 7,898,939 B2
(45) Date of Patent: Mar. 1, 2011

(54) SCALABLE AND ROBUST MECHANISM FOR REMOTE IP DEVICE MONITORING WITH CHANGING IP ADDRESS ASSIGNMENT

(75) Inventors: Herman H. Lee, Morganville, NJ (US); Richard A. Brotz, Bartlett, IL (US); Chin-Wang Chao, Lincroft, NJ (US); Wenwen Ji, Cedar Knolls, NJ (US); Drew D. Johnson, Tampa, FL (US); Ronald E. Papritz, Amityville, NY (US); Gregory S. Pedder, Raleigh, NC (US)

(73) Assignee: AT&T Intellectual Property I, L.P., Reno, NV (US)

( * ) Notice: Subject to any disclaimer, the term of this patent is extended or adjusted under 35 U.S.C. 154(b) by 183 days.

(21) Appl. No.: 12/335,671

(22) Filed: Dec. 16, 2008

(65) Prior Publication Data

US 2010/0150170 A1    Jun. 17, 2010

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/216; 370/466; 370/254
(58) Field of Classification Search .................. 709/223, 709/224, 246
See application file for complete search history.

(56) References Cited

U.S. PATENT DOCUMENTS

| 6,173,323 | B1 | 1/2001 | Moghe | |
| 2004/0024869 | A1* | 2/2004 | Davies | 709/224 |
| 2005/0038889 | A1* | 2/2005 | Frietsch | 709/224 |
| 2006/0026301 | A1* | 2/2006 | Maeda et al. | 709/246 |
| 2008/0059623 | A1* | 3/2008 | Yang et al. | 709/223 |
| 2008/0228908 | A1* | 9/2008 | Link et al. | 709/223 |

OTHER PUBLICATIONS

From Wikipedia, the free encyclopedia, Simple Network Management Protocol [online]; [retrieved on Nov. 6, 2008] retrieved from the Internet http://en.wikipedia.org/wiki/Simple_Network_Management_Protocol.html.

* cited by examiner

*Primary Examiner* — Ricky Ngo
*Assistant Examiner* — David Oveissi
(74) *Attorney, Agent, or Firm* — Cantor Colburn LLP

(57) ABSTRACT

A method is provided for monitoring devices with changing IP addresses. SNMP trap is received from a device at a first IP address to notify that a connection is up, and a SNMP poll is transmitted to the device to obtain an identifier. Predetermined consecutive SNMP GET requests are transmitted to the device in intervals. Responsive to failing to receive from the device predetermined consecutive SNMP GET responses equal to the predetermined consecutive SNMP GET requests, it is determined that there is a connection failure or a device failure and checked whether the device is in a maintenance window. If not in maintenance window, a trouble ticket is generated. Responsive to the failure, there is a predetermined waiting period for another SNMP trap from the device with a second IP address and the same identifier notifying that a connection is back up, and no trouble ticket is generated.

17 Claims, 12 Drawing Sheets

FIG. 2

Table 1: Device Table (in SI, MD, and FM)

| Data Field | Description | Note |
|---|---|---|
| Device ID | The unique identifier of the AT&T managed CPE. The data stays the same throughout the life-cycle of the customer service. | Example of Device ID can be MAC address, host name, or vendor/model/serial# of the device. Since the IP address of the device changes from time to time, it cannot be used as the Device ID. |
| Management Indicator | AT&T or customer managed | Exemplary embodiments may only address the fault monitoring of the ATT managed devices. |
| Maintenance Window | Daily, Weekly, Monthly, or Yearly | This may be a complex data structure to accommodate different possibilities. |
| Device Hostname | Host name of the remote device | |
| Region Code | Region code for distribution algorithm in MD | |
| Customer ID | Customer ID for distribution algorithm in MD | |
| Site ID | Customer Site ID for distribution algorithm in MD | |

FIG. 3

Table 2: Master Active Monitoring Table (in MD, superset of all local active monitoring session tables)

| Data Field | Description |
|---|---|
| Device ID | The unique identifier of the AT&T managed CPE. The data stays the same throughout the life-cycle of the customer service. |
| IP Address | Current Device IP address |
| Session Start Time Stamp | Time stamp when the monitoring session is initiated |
| FM Server Name | Fault Monitoring Server Name for the monitoring session |

FIG. 4

Table 3: Local Active Monitoring Table (in FM)

| Data Field | Description |
|---|---|
| Device ID | The unique identifier of the AT&T managed CPE. The data stays the same throughout the life-cycle of the customer service. |
| IP Address | Current Device IP address |
| Session Start Time Stamp | Time stamp when the monitoring session is initiated |
| Maintenance Window | Daily, Weekly, Monthly, or Yearly Maintenance Window (This may be a complex data structure to accommodate different possibilities.) |

FIG. 5

Table 4: Trouble Ticket Table (in TT)

| Data Field | Description |
|---|---|
| Trouble Ticket No | Unique Trouble Ticket Number |
| Device ID | The unique identifier of the AT&T managed CPE. The data stays the same throughout the life-cycle of the customer service. |
| Message Text | Description of the detected connection or device problems |
| Creation Time Stamp | Ticket Creation Time Stamp |
| Ticket Status | Open, Pending, Closed, etc. |

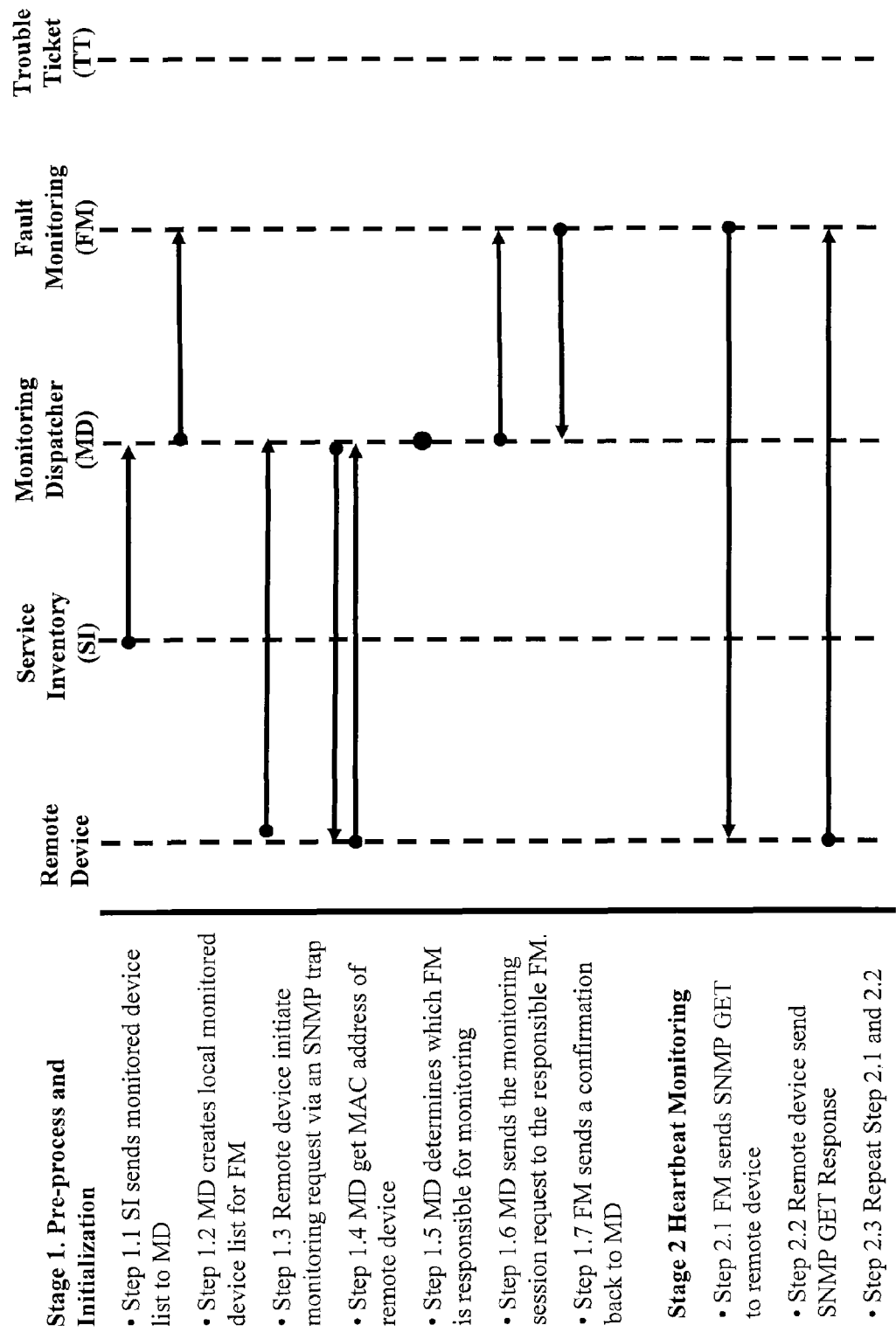
FIG. 6 Interaction Diagram (1 of 2)

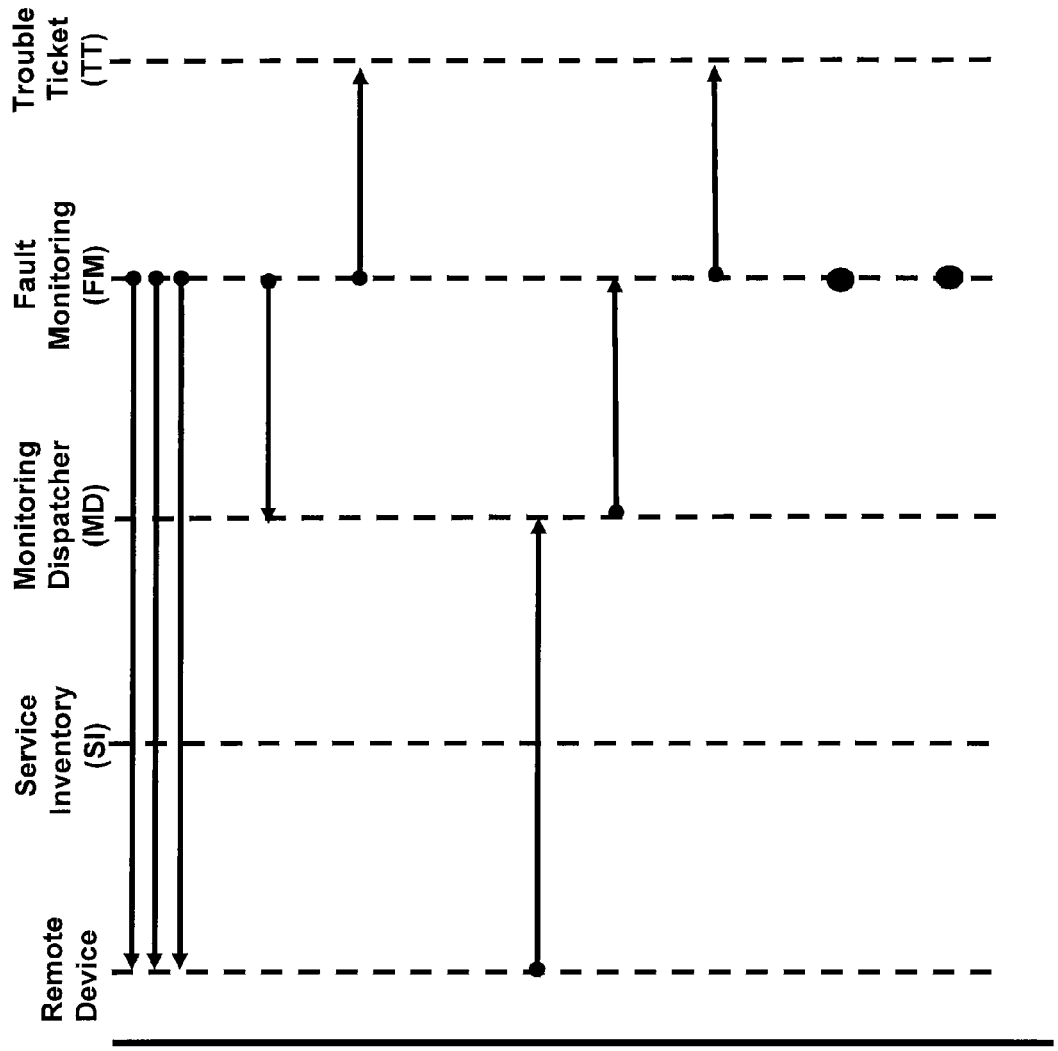
FIG. 7 Interaction Diagram (2 of 2)

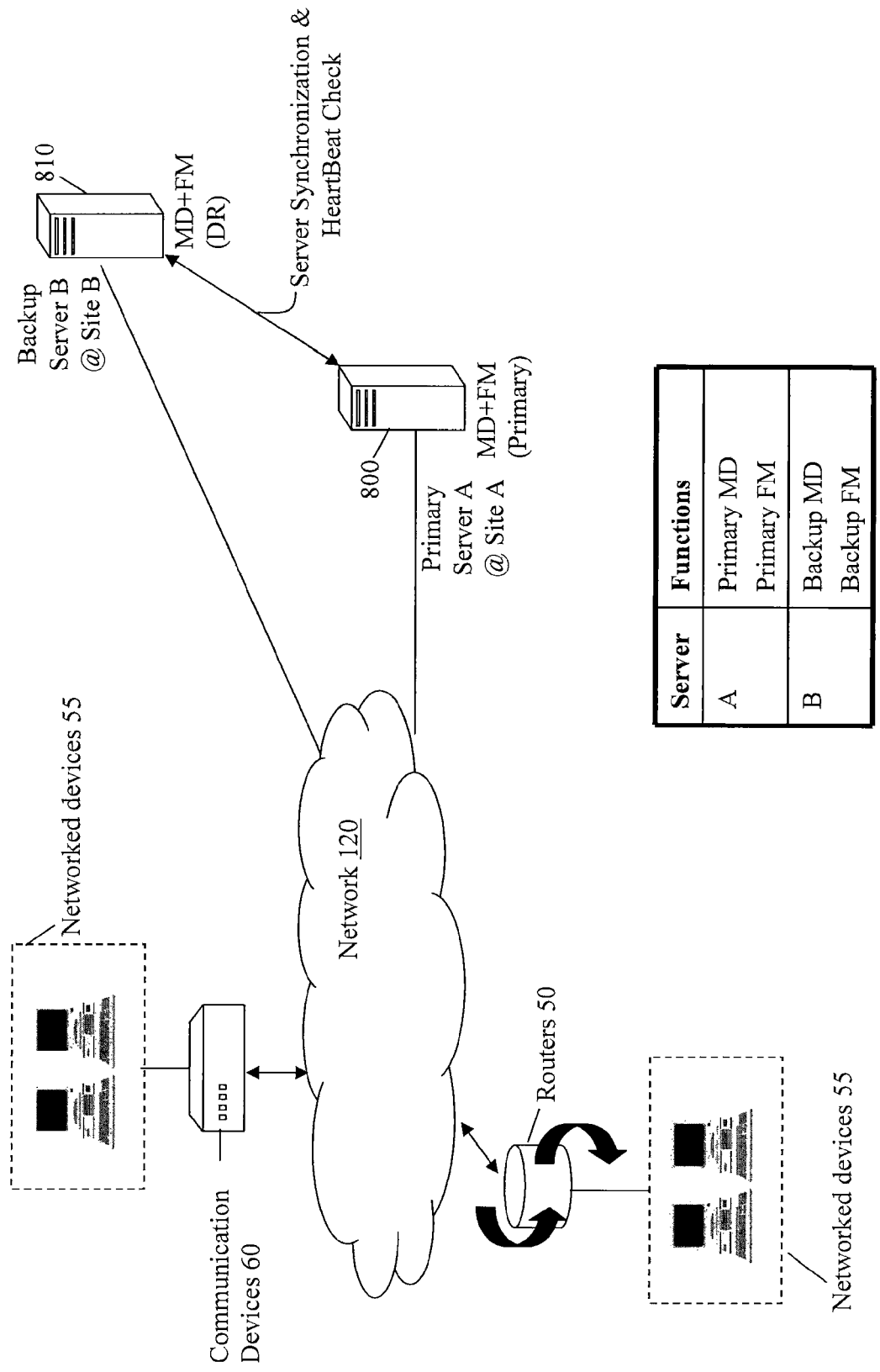
FIG. 8 Scalability and Disaster Recovery Illustrating 2 Server Configuration

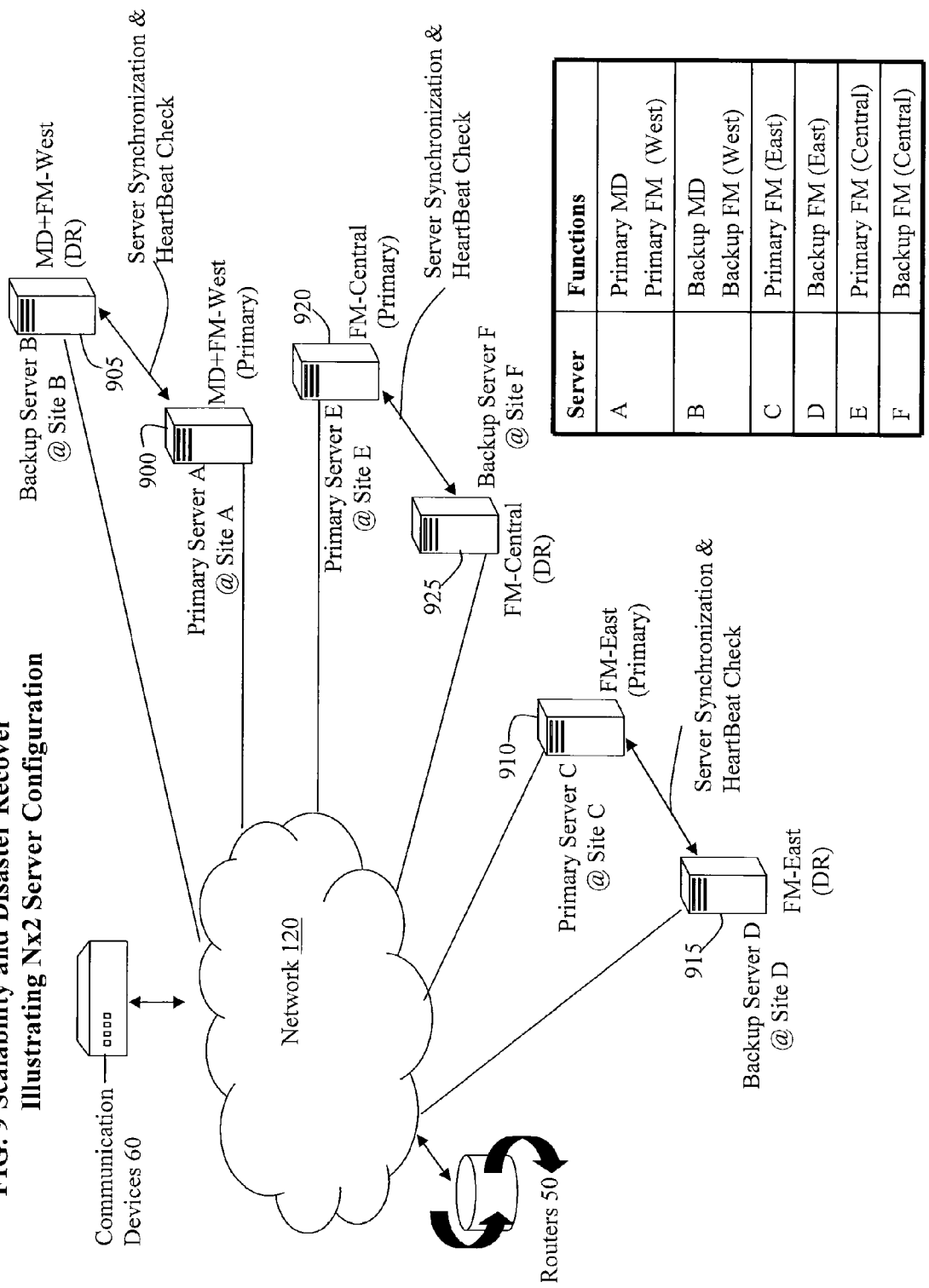
FIG. 9 Scalability and Disaster Recover Illustrating Nx2 Server Configuration

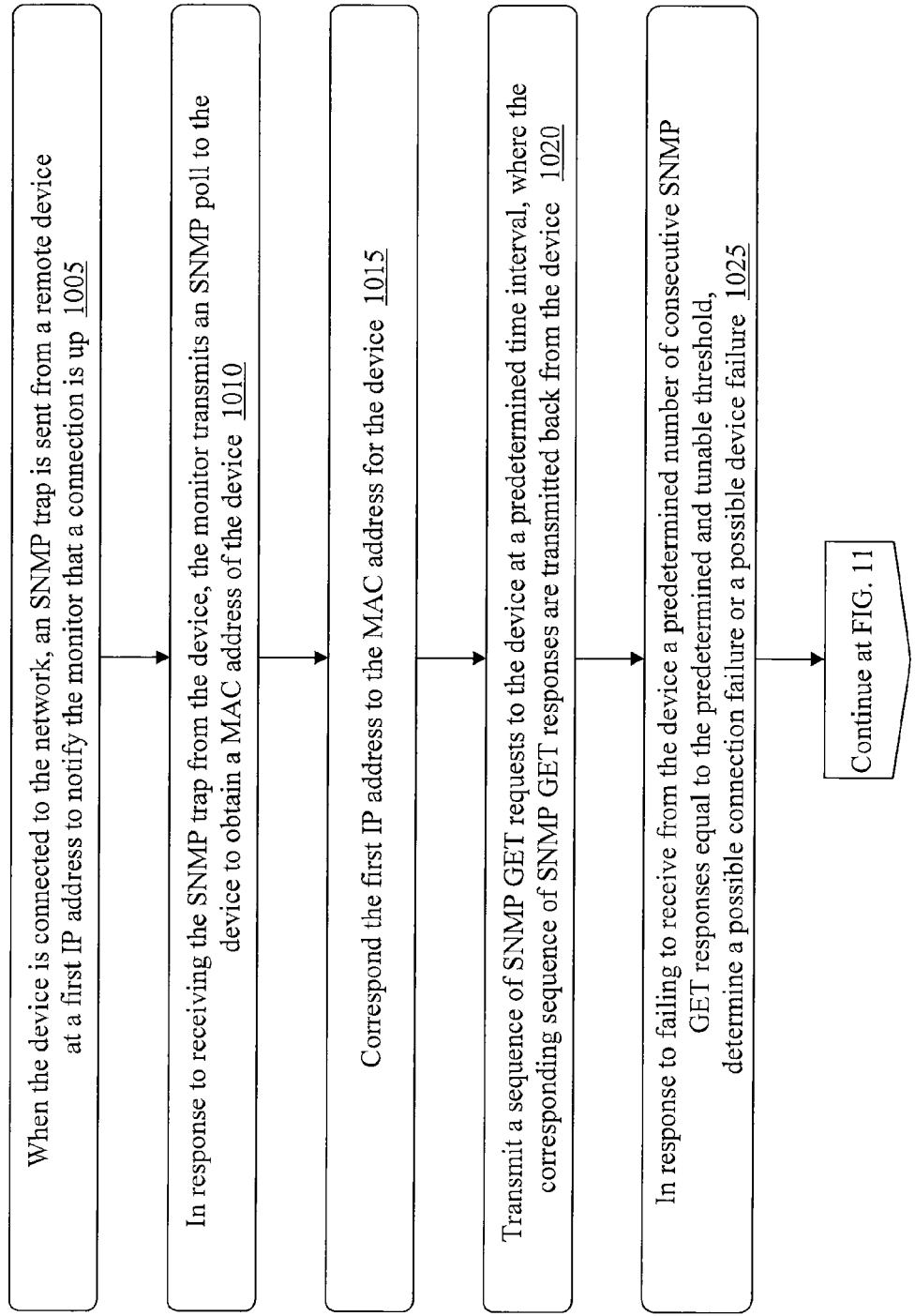
FIG. 10 Flow Chart (1 of 2)

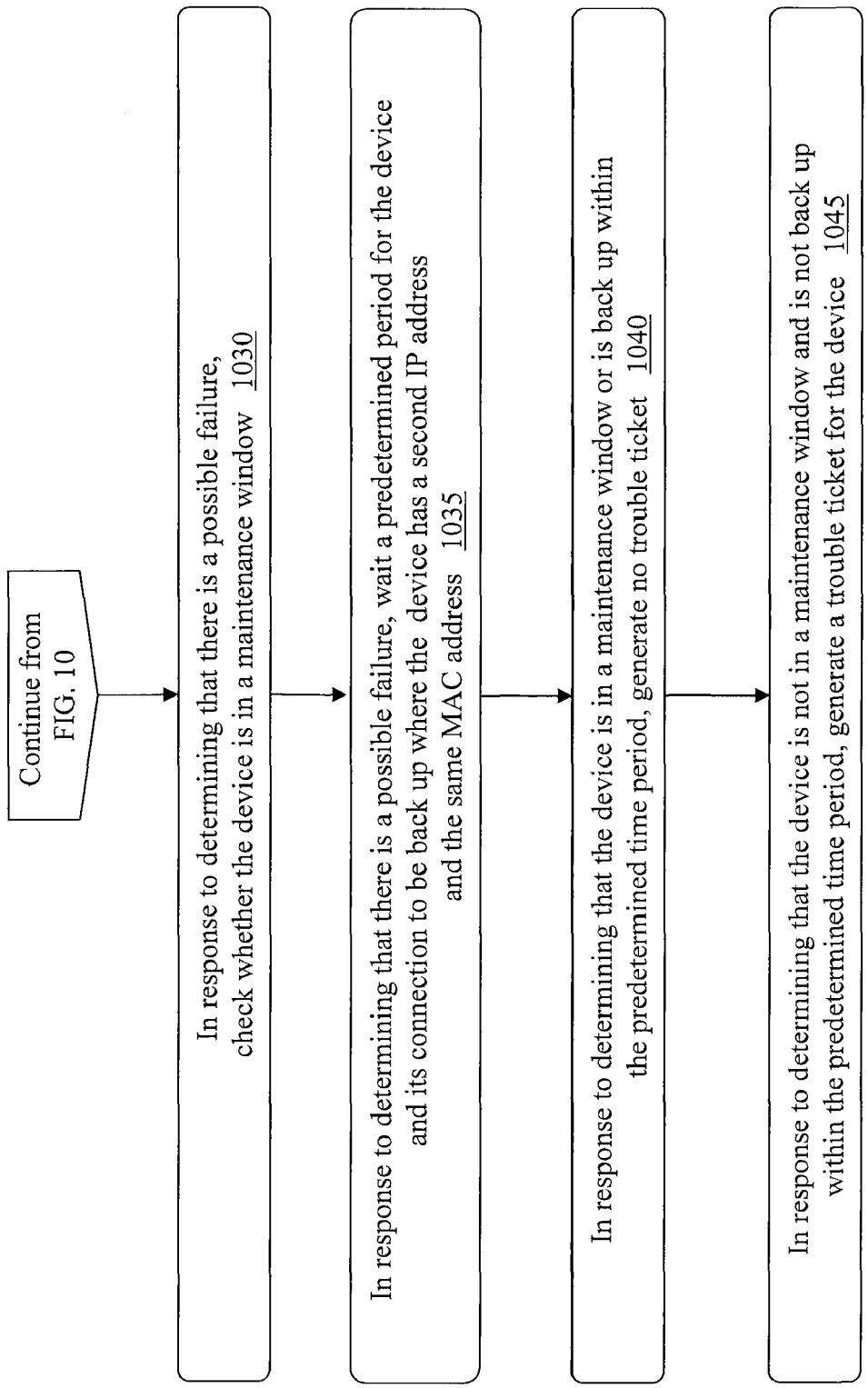
FIG. 11 Flow Chart (2 of 2)

SCALABLE AND ROBUST MECHANISM FOR REMOTE IP DEVICE MONITORING WITH CHANGING IP ADDRESS ASSIGNMENT

BACKGROUND

Exemplary embodiments relate generally to communications, and more particularly, to remote monitoring of IP devices having changing IP addresses.

Since the Internet has become an essential part of daily business, connectivity monitoring is performed of devices (such as, Netgate devices or Cisco routers) using dynamic host configuration protocol (DHCP) IP addresses provided by an Internet Service Provider (ISP).

Some customers may utilize virtual private networks (VPN) such as AT&T VPN Tunnel Services (AVTS) and AT&T NB IP-VPN Remote Access (ANIRA) Service, and the remote customers at small office/home office (SOHO) locations may often use Netgate devices or Cisco routers to access corporate VPN networks for emails, client/server applications, Intranet applications, WWW access, etc. The connection is usually provided by AT&T or other service providers via dial up, xDSL, cable modem, and ISDN types of internet connection connections.

For some customers, e.g., a major local branch office, the customers always want the connection to be up, except maybe occasional disconnect/connect bounce of the connections by ISPs to re-claim IP addresses and assign new ones. However, if the connection is down for more than a certain time, this down time may impact the customer's business operation. Thus, the customer wants the ISP to proactively monitor the connection failure, notify them of any problem, troubleshoot the problems, and recover the service.

It has been a challenge to monitor these remote location devices, i.e., routers, modems, etc., since the IP connection monitoring application has to know the IP address of the remote device in order to perform pinging or polling of the device while its IP addresses change from time to time as the ISPs bounce the connections from time to time to re-claim existing IP addresses and assign new IP addresses.

BRIEF SUMMARY

Exemplary embodiments include a method for monitoring devices with changing Internet protocol (IP) addresses. When a device is connected to the network, an SNMP trap is sent by the remote device at a first IP address to notify the monitor application that a connection is up. In response to receiving the SNMP trap from the device, an SNMP poll is transmitted from the monitor application to the device to obtain an identifier for the device. The first IP address is corresponded to the identifier, which is the permanent identifier of the device. A sequence of SNMP GET requests is transmitted at predefined time intervals to the device, where the corresponding sequence of SNMP GET responses are transmitted back by the device. In response to failing to receive from the device a predetermined number of consecutive SNMP GET responses equal to the predetermined threshold, it is determined that there is possibly a connection failure or a device failure. In response to determining that there is a possible failure, it is checked whether the device is in a maintenance window. In response to determining that there is a possible failure, there is a wait for a predetermined period for the device and its connection to back up, where the device has a second IP address and the same identifier. In response to determining that the device is in a maintenance window or its connection is back up within the predetermined period, no trouble ticket is generated. If the device is not in a maintenance window and is not back up within the predetermined period, a trouble ticket is generated for the device.

Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 2 illustrates a data structure in Table 1 that may be used in a service inventory module in accordance with exemplary embodiments;

FIG. 3 illustrates a data structure in Table 2 for an active monitoring session table of a monitoring dispatcher module in accordance with exemplary embodiments;

FIG. 4 illustrates a data structure for a local active monitoring session table of the fault monitoring module in Table 3 in accordance with exemplary embodiments;

FIG. 5 illustrates a data structure in a trouble ticket module as Table 4 in accordance with exemplary embodiments;

FIGS. 6 and 7 illustrate an interaction diagram for proactive monitoring of remote devices in accordance with exemplary embodiments;

FIG. 8 depicts a 2-server configuration illustrating scalability and disaster recovery in accordance with exemplary embodiments;

FIG. 9 depicts an N×2 server configuration illustrating scalability and disaster recovery in accordance with exemplary embodiments;

FIGS. 10 and 11 illustrate a method for monitoring devices with changing Internet protocol addresses in accordance with exemplary embodiments;

Figure 1:
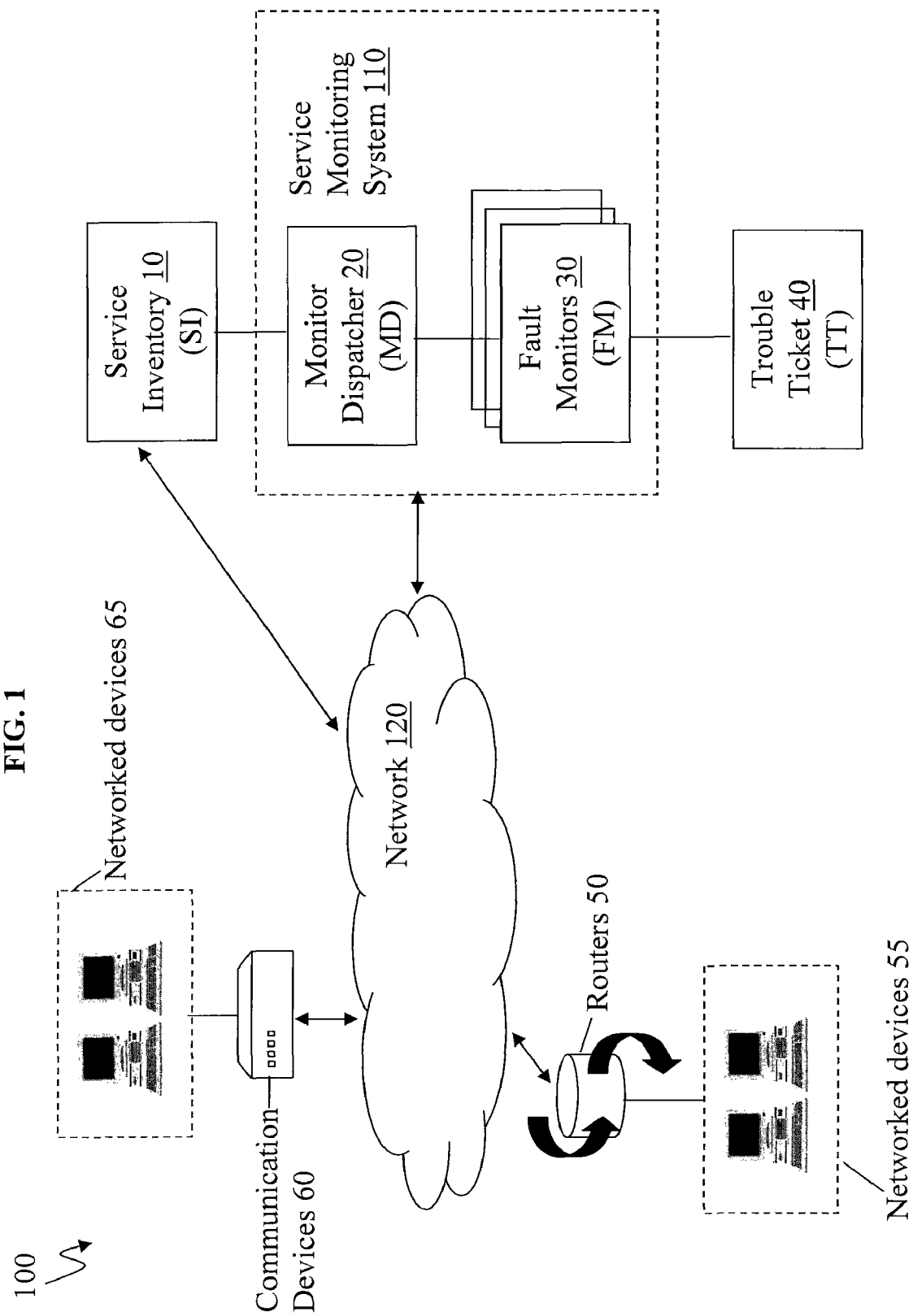
FIG. 1 is a block diagram which illustrates fault management of remote devices with changing IP addresses in accordance with exemplary embodiments.

The detailed description explains the exemplary embodiments, together with features, by way of example with reference to the drawings.

DETAILED DESCRIPTION OF EXEMPLARY EMBODIMENTS

Exemplary embodiments provide a scalable and robust solution for connectivity and device monitoring of remote Internet Protocol (IP) network devices with constant changing IP addresses. Since an IP address is the most common identifier of devices in the IP network, changing IP address provides a unique challenge to network service providers to monitor the connectivity and operational status of these devices. Exemplary embodiments can leverage several innovative techniques and the simple network management protocol (SNMP) to monitor varieties of remote IP devices from multiple vendors at the customer premises.

Exemplary embodiments provide mechanisms for proactively monitoring customer premises equipment (CPE) devices with changing IP addresses provided by a variety of ISPs. Exemplary embodiments provide scalable options for large service provider IP networks for connectivity and operation status monitoring of a large number of managed CPE devices with changing IP addresses, and provide a disaster recovery solution for 24×7 monitoring of the remote CPE devices.

Exemplary embodiments are flexible in the monitoring technology for performing a heartbeat check between the monitoring application and the remote CPE device, e.g., using ICPM ping, SNMP polling, or http queries. Therefore, it supports monitoring of multiple vendor devices using different monitoring technologies. Also, exemplary embodiments are capable of supporting scheduled maintenance windows of the remote devices to avoid false alarms when the device is taken off-line for maintenance, and enable the service provider to synchronize (sync) up the device inventory data with the live production data to identify non-active devices or to recover re-usable disconnected assets. Exemplary embodiments use a tunable smoothing interval (e.g., 15 minutes) to accommodate occasional IP address flipping of the remote device by the Internet Service Provider (ISP) which uses Dynamic Host Control Protocol (DHCP) for remote device IP address assignment. Exemplary embodiment use the SNMP traps/notifications for device operational status monitoring, which complements the heart beat monitoring to provide complete fault monitoring of the remote devices, such as customer routers and switches. The Dynamic Host Configuration Protocol (DHCP) is a protocol for assigning dynamic IP addresses to devices on a network. With dynamic addressing, a device can have a different IP address every time it connects to the network. In some systems, the device's IP address can even change while it is still connected.

A CPE device is telecommunications hardware located at the home or business of a customer. Such equipment might include cable or satellite television set-top boxes, digital subscriber line (DSL), broadband Internet routers or modems, VoIP base stations, telephone handsets, or other customized hardware used by a particular telecommunications service provider.

Now turning to FIG. 1, FIG. 1 is a block diagram 100 which illustrates fault management of remote devices (CPEs) with changing IP addresses in accordance with exemplary embodiments. A service monitoring system 110 may be operatively connected to a network 120 for monitoring remote devices. The remote devices may be one or more routers 50, one or more communication devices 60, and/or any type of CPE. The communication device 60 may be representative of modems, hubs, servers, set top boxes, and other devices for operatively connecting to a network. The communication device 60 is configured to operatively connect networked devices 65 to the network 120. For example, the communication device 60 may be the interface to connect computers, such as networked devices 65, to the Internet (e.g., the network 120). Also, the router 50 is configured to operatively connect networked devices 55 to the network 120.

Further regarding the network 120, the network 120 may include circuit-switched and/or packet-switched technologies and devices, such as routers, switches, hubs, gateways, etc., for facilitating communications. The network 120 may include wireline and/or wireless components utilizing, e.g., IEEE 802.11 standards for providing over-the-air transmissions of communications. The network 120 can include IP-based networks for communication between a customer service center and clients/users. The network 120 can manage multiple accounts as established by particular users. These accounts may then be used to provide access to services as described herein.

Also, the network 120 may include wireline and/or wireless components utilizing standards for, e.g., multimedia messaging services (MMS). The network 120 may include a multimedia messaging center (MMC), which implements the network side of multimedia messaging service (MMS) and makes it possible for an operator to offer multimedia messaging to mobile communication device users. The MMC is a highly flexible system, which can be adapted to the needs of the operator and the particular end users involved. The MMC manages different sources to/from mobile terminals, supporting a wide range of standard interfaces.

According to exemplary embodiments, the network 120 facilitates transmission of media (e.g., images, video, data, multimedia messaging, etc.) from content services provider systems to customers/users via devices. In exemplary embodiments, the network 120 can include a managed IP and/or wireless network administered by a service provider, which can control bandwidth and quality of service for the communications discussed herein. The network 120 may be implemented in a wireless fashion, e.g., using wireless protocols and technologies, such as WiFi, WiMax, BLUETOOTH, etc. The network 120 can also be a packet-switched network, such as a local area network, a wide area network, a metropolitan area network, an Internet network, or other similar types of networks. The network 120 may be a cellular communications network, a fixed wireless network, a wireless local area network (LAN), a wireless wide area network (WAN), a personal area network (PAN), a virtual private network (VPN), an intranet or any other suitable network, and the network 120 may include equipment for receiving and transmitting signals, such as a cell tower, a mobile switching center, a base station, and a wireless access point.

The service monitoring system 110 may include one or more monitor dispatchers (MD) 20 and one or more fault monitors (FM) 30. Also, the service monitor system 110 may include or be operatively connected to a service inventory (SI) 10 and a trouble ticket (TT) 40. The service monitoring system 110, the monitor dispatcher (MD) 20, fault monitor (FM) 30, the service inventory (SI) 10, and the trouble ticket (TT) 40 may be implemented in servers or other computing devices as components, modules, applications, application specific integrated circuits, etc., and may be distributed over a network.

In accordance with exemplary embodiments, the service inventory (SI) module 10 may be responsible for maintaining the remote device information, e.g., equipment ID, location, type, vendor, site ID, and the like for devices such as the router 50 and the communication device 60. The customer information may include, e.g., contacts, addresses, phone numbers, email addresses, beeper numbers, and the like. The site information may include, e.g., site ID, site address, site phone, etc. The service inventory 10 may include the service information for a device, such as, e.g., service type, features, configuration, etc. Also, the service inventory 10 may include service assurance information for the device such as, e.g., AT&T managed or customer managed, and if AT&T managed, for example, the service assurance information may include the scheduled maintenance windows if any.

The monitor dispatcher (MD) module 20 may be responsible for interfacing with the SI 10 to retrieve device and service assurance information, responding to remote device monitoring request prompts to initiate the monitoring session, identifying the equipment ID of the remote device, distributing the remote device monitoring to the appropriate fault monitor (FM) 30, and trap forwarding to the fault monitor (FM) 30 based on the trap and device information.

The fault monitor (FM) module 30 may be responsible for receiving and storing the session monitoring information from the MD 20; performing heartbeat monitoring of the remote device via ICMP ping, SNMP polling, http queries, or etc.; processing traps or unsolicited event notification from the remote devices; detecting connection or operation problems of the remote devices (CPEs) and creating a request for generating trouble tickets as needed; and performing sync up between the SI module 10 and the active monitoring device information to check for discrepancies.

The trouble ticket (TT) 40 module may be responsible for generating pro-active trouble tickets based on events/alarms received from the FM 30 (for connection or device failure and for out-of-sync devices between SI 10 and MD 20).

For illustrative purposes and not limitation, the block diagram 100 depicts the MD 20 and the FM 30 as part of the service monitoring system 110 and shows the SI 10 and the TT 40 as external applications. It is understood that any arrangement could be implemented in accordance with exemplary embodiments, and the SI 10, MD 20, FM 30, and/or TT 40 can be locally or remotely situated from one another.

In FIG. 1, although exemplary embodiments illustrate the monitor dispatcher 20 (MD) and the fault monitors (FM) 30 as one integral service monitoring (application) system 11, it is understood that the monitor dispatcher (MD) 20 and the fault monitors 30 (FM) could be separate. Exemplary embodiments illustrate two external interfaces, i.e., between the service inventory (SI) 10 and the monitor dispatcher (MD) 20 and between the fault monitor (FM) 30 and the trouble ticket (TT) 40. Also, there is an internal interface between the MD 20 and the FM 30.

The combined functions of the MD 20 and the FM 30 may include any feature of fault monitoring, fault management, or service assurance application in the Operation Support System (OSS) architecture.

Tables 1-4 are shown in FIGS. 2-5 to present examples of data structures which can be utilized in exemplary embodiments. Although simple data structures are presented in FIGS. 2-6 for illustrative purposes and brevity, it is understood that other data structures may be utilized to capture the same information.

FIG. 2 illustrates a data structure in Table 1 that may be used in the service inventory (SI) 10. The data structure in the SI 10 is to enable the MD 20 to distribute the monitoring sessions to different FM 20 servers, and more data may be needed for the load balancing, distribution algorithm of the MD 20. If so, additional data may be added to the data structure in Table 1. Table 1 is a device table that provides various information about the device, such as the router 50 and the communication device 60, being monitored. The SI 10 would include a device table for each device monitored by the MD 20 and FM 30.

To illustrate exemplary embodiments, two tables are referenced for the MD 20 which are a device table and active monitoring session table. The device table (Table 1 of FIG. 2) for the MD 20 is imported from the SI 10. A separate device table is not shown for the MD 20 as reference is made to Table 1 of FIG. 2. The MD 20 includes respective device tables, such as Table 1, for each remote device being monitored.

FIG. 3 illustrates a data structure in Table 2 for the active monitoring session table of the MD 20. The Table 2 provides information for the monitoring session of a device, and the Table 2 would relate to a plurality of devices being monitored. As mentioned earlier, for the MD 20 to distribute the monitoring sessions to different FM 30 servers, more data may be needed for the load balancing, distribution algorithm, and additional data can be added to the data structure.

The data structure in the FM 30 may include a local device table (e.g., Table 1 of FIG. 2) and a local active monitoring session table (e.g., Table 3 of FIG. 4). The local device table of the FM 30 is omitted and reference can be made to the device table in Table 1 of FIG. 2. FIG. 4 illustrates the data structure for the local active monitoring session table in Table 3. The FM 30 also includes a corresponding local active monitoring session table in Table 3 for each device that the FM 30 is responsible for monitoring.

FIG. 5 illustrates a data structure in the TT 40 as Table 4. Table 4 is a trouble ticket table which includes information regarding devices that have connection or device problems. The TT 40 may utilize information in the Table 4 to generate trouble tickets for devices being monitored.

For the SI-to-MD interface, the SI 10 sends total service assurance information about all managed devices to the MD 20 daily or weekly for a total sync-up, and the SI 10 sends incremental service assurance information about add-change-delete of managed devices (such as adding the routers 50 and/or removing the communication device 60) at hourly or periodical intervals.

For the FM-to-TT interface, the FM 30 sends ticketing request to the TT 40 to create or update trouble tickets.

For the MD-to-FM interface (which may be internal to the service monitor system 110), the MD 20 transmits session monitoring request to the FM 30 to start session monitoring. The MD 20 forwards traps to the FM 30 for trap processing and event correlation. The FM 30 transmits session confirmation response to the MD 20 to maintain in the master active session table in the MD 20 for trap forwarding. The FM 30 transmits session termination notification to the MD 20 to end monitoring session in the master active session table for trap forwarding.

Exemplary embodiments enable the service provider to proactively monitor any connection and device problems associated with CPEs at customer sites that change their IP addresses from time-to-time. A trouble ticket will be generated automatically when a critical or major problem is detected. Driven by the pro-active trouble ticket, the customer care supporting staff will immediately be notified to resolve the problem and/or to contact the customer. Also, the customers may pay a premium for the proactive monitoring service, for which the service provider has the responsibility to keep the service running 24×7 except for scheduled maintenance windows in accordance with exemplary embodiments. Once a problem occurs, the service provider may be required to recover the service within a certain time window as specified in the service level agreement (SLA).

FIGS. 6 and 7 illustrate an interaction diagram for proactive monitoring of remote devices in accordance with exemplary embodiments.

For ease of understanding and illustrative purposes only, the proactive monitoring is broken down into several stages of operation. It is appreciated that exemplary embodiments are not meant to be limited by the explanatory stages of operation.

Stage 1—Pre-Process and Initialization:

At 1.1, the SI 10 sends a monitored device list (full or delta) to the MD 20 such as the device table in Table 1, including the MAC address (e.g., a unique device identifier), monitored or not monitored, regional code, and maintenance window. At 1.2, the MD 20 creates separate monitored device lists for different FMs 30. For example, separate monitored device list may be created for FM east, FM west, FM central, FM south, etc.

At 1.3, when a remote device (such as the routers 50 and communication devices 60) establishes a new connection to the network 120, the remote device sends SNMP traps, e.g., cold start, warm start, Internet protocol security (Ipsec) tunnel start traps, to the MD 20 to notify that the connection is up for the remote device. IPsec is a suite of protocols for securing Internet Protocol (IP) communications by authenticating and encrypting each IP packet of a data stream. IPsec also includes protocols for establishing mutual authentication between agents at the beginning of the session and negotiation of cryptographic keys to be used during the session. IPsec can be used to protect data flows between a pair of hosts (e.g., computer users or servers), between a pair of security gateways (e.g., routers or firewalls), or between a security gateway and a host.

At 1.4, the MD 20 performs SNMP Poll of the remote device to obtain the remote device MAC address. The IP-to-MAC mapping is stored in the monitoring session table, such as the master active monitoring table in Table 2 of FIG. 3. A monitoring session starts when the connection from the monitoring station (e.g., the service monitoring system 110) to the remote device is up and ends when the connection is down.

At 1.5, utilizing the MAC address and monitored device list from the SI 10, the MD 20 determines which FM 30 is responsible for monitoring the device. The distribution logic can be round-robin, by region, by service type, by customer, etc. There may be many fault monitors 30, such as a fault monitor west that is responsible for the west side of the country and a fault monitor east that is responsible for the east side of the country.

At 1.6, the MD 20 sends the monitoring session request, along with the IP address and MAC address of the remote device, to the responsible FM 30. The FM 30 checks if the device needs to be monitored, e.g., if the device is in or out of a maintenance window. If YES the device needs to be monitored as the device is not in a maintenance window, a monitoring session is established and the IP-to-MAC address mapping is stored in FM for the entire monitoring session. If NO the device does not need to be monitored at this time, no monitoring session is established. The monitoring session can be established when the FM 30 determines that the device is not in a maintenance window.

At 1.7, the FM 30 sends a confirmation back to the MD 20 for maintaining in the master monitoring session table in the Table 2 of FIG. 3.

Stage 2—Heartbeat Monitoring:

At 2.1, the FM 30 (west) sends "SNMP GET" request via, e.g., secure shell (SSH) to the remote device. SSH is a network protocol that allows data to be exchanged using a secure channel between two networked devices.

At 2.2, the remote device sends "SNMP GET:" response back via SSH to the FM 30.

At 2.3, the FM 30 and the remote device repeat steps 2.1 and 2.2 at predetermined and tunable time interval, e.g., repeated every 5, 10, 15, 20, 25, 30, 35 minutes or more.

Stage 3—Connection or Device Failure:

At 3.1, when there is a connection or device failure, the FM 30 sends 3 (tunable) consecutive SNMP: GET with no responses from the device. The FM 30 may continuously increase the tunable interval between the 3 consecutive SNMP: GET. For example, the FM 30 may send the first SNMP: GET to the device, and receive no response back from the device. The FM 30 may send the second SNMP: GET to the device after a period of time (e.g., 20 minutes), and receive no response back from the device. The FM 30 may send the third consecutive SNMP: GET to the device after a longer period of time (e.g., 45 minutes), and receive no response back from the device. If no SNMP GET response is received from the device after transmitting 3 consecutive SNMP: GET, the FM 30 may determine that there is a connection down event. For example, the FM 30 may determine (preliminarily) that there is potential problem regarding the device, such as a device failure or a connection failure.

At 3.2, the FM 30 sends a session terminated notification to MD 20 for maintaining in the master monitoring session table in the Table 2 of FIG. 3. Note that the MAC address of the device is stored in FM 30 at the beginning of the monitoring session. The monitoring session is ended when there is a disconnect or device failure. The monitoring session and the IP-to-MAC address mapping will be re-established when a monitoring request is received again from the remote device, i.e., repeat step 1.3-1.7 discussed earlier.

At 3.3, the FM 30 applies a tunable smoothing interval (e.g., 15 min) to the connection down event by waiting for the connection up event from the same device within the smoothing interval. The smoothing interval is applied to accommodate IP address flipping by the ISP. The smoothing interval allows the FM 30 time to wait for the device (e.g., the router 50 or communication device 60) to obtain a new IP address. In accordance with exemplary embodiments, the router 50 is preconfigured to transmit a connection up SNMP trap to the MD 20 once the router 50 establishes a new connection to the network 120 and obtains its new IP address. Step 1.3 to Step 1.7 are repeated. When transmitting the connection up event, the remote device, e.g., router 50, is configured to transmit its new IP address along with its MAC address to the MD 20 and FM 30. With this information, the FM 30 can correlate the MAC address of the device with the previously stored MAC address of the device, even though the device now has a new IP address. If the device is back up within the predetermined and tunable time window, no trouble ticket is generated. Accordingly, the MD 20 and the FM 30 are designed to accommodate IP address changes of the device (router 50) and to continue monitoring the device via Step 2.1 to Step 2.3 with the new IP address.

Also, the FM 30 checks the monitoring list from the SI 10 by utilizing the MAC address of the device to see if a trouble ticket needs to be generated (e.g., not in a maintenance window and is not reconnected to the network 120 within the predetermined time window) for the device. If YES a trouble ticket needs to be generated, a ticket generation request will be sent to the trouble ticket (TT) module 40 for the device.

Stage 4—SNMP Trap Processing:

At 4.1, the device sends SNMP traps to the MD 20.

At 4.2, the MD 20, using the IP address of the device and the master active monitoring table to find the responsible FM 30, forwards the traps to the FM 30 for processing.

At 4.3, the FM 30 requests for trouble ticket generation by the trouble ticket 40 application if needed based on the severity of the SNMP traps.

Stage 5—Inventory Verification or Server-End Initialized Verification:

At 5.11, the FM 30 checks periodically (tunable) for the differences of the device in the local active monitoring session table (in the Table 3 of FIG. 4) versus the monitored device list of Table 1 of FIG. 2 from SI 10 (e.g., monitored or not, maintenance window, etc). If a device is in the monitored device list, but not in the active monitoring table, it may be caused by configuration errors of the remote device. On the other hand, if a device is in the active monitoring session table, but not in the monitored device list, it may be caused by inventory data errors.

At 5.12, the FM 30 creates an error report for customer care associates to investigate the differences in comparing the monitored device list and the active monitoring table.

Now turning to scalability and disaster recovery configurations of exemplary embodiments, two design issues are scalability for growth and availability for disaster recovery. Exemplary embodiments can enhance scalability and disaster recovery with the addition of the monitoring dispatcher (MD) module, the distribution of multiple fault monitoring (FM) modules, and server-side initiated heartbeat as discussed herein.

FIG. 8 depicts a 2-server configuration illustrating scalability and disaster recovery in accordance with exemplary embodiments. A server 800 represents a primary server A at site A. The server 800 can implement the monitor dispatcher module 20 and the fault monitor module 30 in accordance with exemplary embodiments.

A server 810 represents a backup server B at site B, which is a different location from site A of the primary server 800. The server 810 implements the backup monitor dispatcher module 20 and the backup fault monitor 30, and the server 810 can be utilized in disaster recovery.

The remote router 50 and communication device 60 send notifications to both the MD 20 in the server A (800) and the MD 20 in the server B (810). During normal operations, the active MD 20, which is in the primary server A (800), is responsible for dispatching. The primary server A (800) at site A and the backup server B (810) at site B are configured to synchronize with each other and to perform heartbeat check with each other, so that both server A and server B are aware of their respective status. As such, the primary server A (800) can utilize heartbeat monitoring to recognize when the backup server B (810) is down, and the backup server B (810) can utilize heartbeat monitoring to recognize when the primary server A (800) is down.

Also, the servers 800 and 810 are configured to determine if one server has more update information regarding the status of remote devices, such as the router 50 and the communication device 60. If the MD 20 in the primary server A (800) has more recent remote device data than the MD 20 in the backup server B (810), or if the MD 20 in the backup server B (810) has more recent remote device data than the MD 20 in the primary server A (800), the primary server A and/or the backup server B are respectively configured to determine if there is a problem with (the MD 20 in) the backup server B or the (MD 20 in the primary server A.

As an example of a disaster recovery scenario, the primary server A (800) at site A is down, and the MD 20 and FM 30 of the server 800 are down. Accordingly, the MD 20 in the backup server B (810) picks up the MD function of the down server A (800). Also, the FM 30 in the backup server B (810) picks up the FM function of the down server A (800).

FIG. 9 depicts an N×2 server configuration illustrating scalability and disaster recovery in accordance with exemplary embodiments. As discussed herein, there can be multiple fault monitors 30, and the responsibility of the fault monitors 30 may be delineated by region, such as west, central, east, etc.

A server 900 represents a primary server A at site A. The primary server 900 can implement the monitor dispatcher module 20 and the fault monitor west module 30 in accordance with exemplary embodiments. A server 905 represents a backup server B at site B, which is a different location from site A of the primary server 900. The backup server 905 implements the backup monitor dispatcher module 20 and the backup fault monitor west module 30, and the server 905 can be utilized in disaster recovery.

A server 910 represents a primary server C at site C. The primary server 910 can implement the fault monitor east module 30 in accordance with exemplary embodiments. A server 915 represents a backup server D at site D, which is a different location from site C of the primary server 910. The backup server 915 implements the backup fault monitor east module 30, and the server 915 can be utilized in disaster recovery.

Further, a server 920 represents a primary server E at site E. The primary server 920 can implement the fault monitor central module 30 in accordance with exemplary embodiments. A server 925 represents a backup server F at site F, which is a different location from site E of the primary server 920. The backup server 925 implements the backup fault monitor central module 30, and the server 925 can be utilized in disaster recovery.

As discussed above for FIG. 8, the server synchronization and heartbeat check can be performed between the various primary servers and their respective backup servers.

Also, the remote devices 50 and 60, which may be, e.g., NetGate and/or Cisco devices, send notifications to both MDs 20 in the servers A (900) and in the server B (905). The active MD 20 is responsible for dispatching. If more than 2 primary FMs 30 are needed for the FM functions, the MD function does not need to be duplicated on the additional FM servers, but could be if desired. Only one primary and one backup MD functions (centralized) are illustrated in FIG. 9. Accordingly, the MD 20 in the primary server A (900) and/or in the backup server B (905) can provide the MD function to correlate with respective FMs 30 for the primary and backup servers 900, 905, 910, 915, 920, and 925.

For illustrative purposes only, the following are different disaster recovery scenarios. In disaster scenario 1, the primary server A (900) at site A is down. The MD 20 in the backup server B (905) picks up the MD function of the down primary server A (900). The FM west 20 in the server B (905) picks up the FM west function of the down primary server A (900).

In disaster recovery scenario 2, the primary server C (910) at site C is down. The FM east 30 in the server D (915) picks up the FM east function the down primary server C (910).

In disaster recovery scenario 3, the MD module 20 in server A (900) is down. The MD 20 in the server B (905) picks up the MD function of the down server A (900).

In disaster recovery scenario 4, the primary server E (920) at Site E is down. The FM central 30 in the backup server F (925) picks up the FM central function.

FIGS. 10 and 11 illustrate a method 1000 for monitoring devices with changing Internet protocol addresses in accordance with exemplary embodiments.

The MD 20 receives an SNMP trap via the network 120 from a remote device (such as, the router 50 and the communication device 60) having a first IP address to notify that a connection is up when the device is connected to the network 120 at 1005.

In response to the MD 20 receiving the SNMP trap from the device, the MD 20 transmits an SNMP poll via the network 120 to the device to obtain a MAC address for the device at 1010.

The MD 20 corresponds the first IP address to the MAC address for the device and stores the IP to MAC address mapping and sends the information to FM 30 for fault monitoring at 1015.

The FM 30 transmits a sequence of SNMP GET requests to the device via the network 120, where the corresponding sequence of SNMP GET responses are transmitted back from the remote devices (e.g., 15 minute intervals) at 1020.

In response to the FM 30 failing to receive from the device a predetermined number of consecutive SNMP GET responses equal to the predetermined and tunable threshold, the FM 30 determines that there is a possible connection failure (of the device to the network or to the Internet) and/or a possible device failure at 1025.

In response to determining that there is the possible failure, the FM 30 checks whether the device is in a maintenance window at 1030.

In response to determining that there is the possible failure, the FM 30 waits a predetermined period (e.g., 10, 15, 20 minutes) for the device and its connection to be back up and reconnect to the network, where the device has a second IP address and the same MAC address at 1035.

In response to determining that the device is in a maintenance window or is back up within the predetermined time period, the FM 30 does not generate a trouble ticket at 1040.

In response to determining that the device is not in a maintenance window and is not back up within the predetermined time period, the FM 30 (via TT 40) generates a trouble ticket for the device at 1045.

Further, in response to failing to receive from the device a predetermined number of consecutive SNMP GET responses, the FM 30 recognizes a preliminary failure of the device. The FM 30 checks the MAC address for the device received during the predetermined waiting period against the previous MAC address for the device to determine that both are the same MAC address, recognizes that the first IP address is different from the second IP address, and corresponds the MAC address to the second IP address for the device. Also, in response to determining that the device has the same MAC address, the FM 30 does not cause a trouble ticket to be generated for the device. If a monitoring session is interrupted, the device is configured to notify a monitoring module (such as the FM 30) that the connection is back up. The monitoring module represents a plurality of monitoring modules distributed across a network, and the plurality of monitoring modules are respectively responsible to monitor a plurality of devices. If any of the plurality of monitoring modules are down, backup monitoring modules are responsible to monitor the plurality of devices in place of any of the down plurality of monitoring modules.

Figure 12:
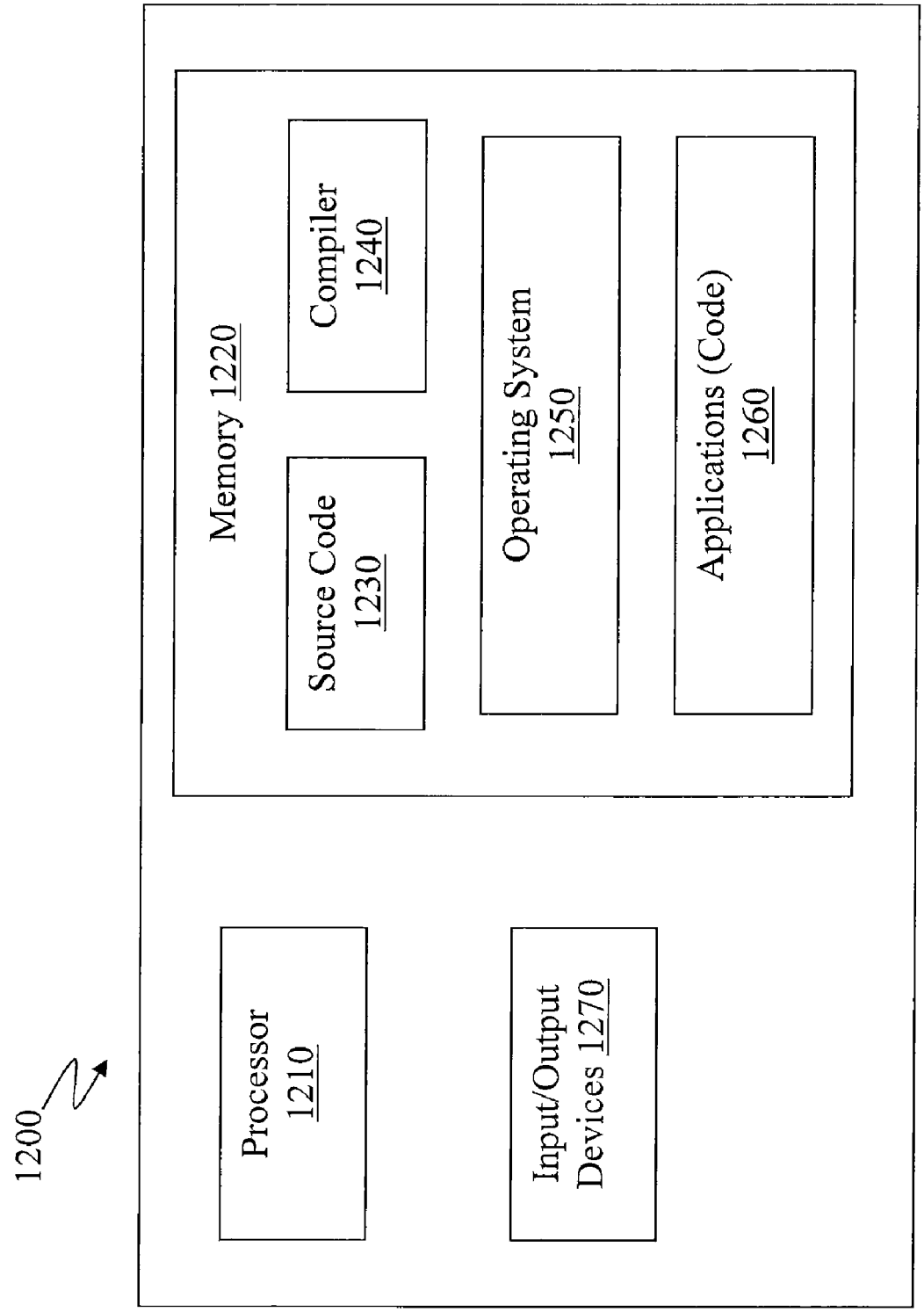
FIG. 12 illustrates an example of a computer having elements that may be used in implementing exemplary embodiments.

FIG. 12 illustrates an example of a computer 1200 having elements that may be used in implementing exemplary embodiments. The computer 1200 includes, but is not limited to, PCs, workstations, laptops, PDAs, palm devices, servers, mobile devices, communication devices, cell phones, and the like. The computer 1200 may include a processor 1210, memory 1220, and one or more input and/or output (I/O) 1270 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1210 is a hardware device for executing software that can be stored in the memory 1220. The processor 1210 can be virtually any custom made or commercially available processor, a central processing unit (CPU), a data signal processor (DSP), or an auxiliary processor among several processors associated with the computer 1200, and the processor 1210 may be a semiconductor based microprocessor (in the form of a microchip) or a macroprocessor.

The memory 1220 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1220 may incorporate electronic, magnetic, optical, and/or other types of storage media. Note that the memory 1220 can have a distributed architecture, where various components are situated remote from one another, but can be accessed by the processor 1210.

The software in the memory 1220 may include one or more separate programs, each of which comprises an ordered listing of executable instructions for implementing logical functions. In the example illustrated in FIG. 12, the software in the memory 1220 includes a suitable operating system (O/S) 1250, compiler 1240, source code 1230, and one or more applications 1260 of the exemplary embodiments.

The operating system 1250 controls the execution of other computer programs, and provides scheduling, input-output control, file and data management, memory management, and communication control and related services. It is contemplated by the inventors that the application 1260 for implementing exemplary embodiments is applicable on all other commercially available operating systems.

The application 1260 may be a source program, executable program (object code), script, or any other entity comprising a set of instructions to be performed. When a source program is to be executed, then the program is usually translated via a compiler (such as the compiler 1240), assembler, interpreter, or the like, which may or may not be included within the memory 1220, so as to operate properly in connection with the O/S 1250. Furthermore, the application 1260 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 1270 may include input devices such as, for example but not limited to, a mouse, keyboard, scanner, microphone, biometric input device(s), etc. Furthermore, the I/O devices 1270 may also include output devices, for example but not limited to, a printer, display, etc. Also, the I/O devices 1270 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1270 include may include modems, gateways, receivers, transmitters, transceivers, etc. for communicating over a communications network.

When the computer 1200 is in operation, the processor 1210 is configured to execute software stored within the memory 1220, to communicate data to and from the memory 1220, and to generally control operations of the computer 1200 pursuant to the software. The application 1260 and the O/S 1250 are read, in whole or in part, by the processor 1210, perhaps buffered within the processor 1210, and then executed.

When the application 1260 is implemented in software, it should be noted that the application 1260 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 1260 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable medium can be stored, communicated, propagated, or transported for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 1260 is implemented in hardware, the application 1260 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits. It is understood that computer program code can be transmitted over some transmission medium, loaded into and/or executed by a computer, or transmitted over some transmission medium, such as over electrical wiring or cabling, through fiber optics, or via electromagnetic radiation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for monitoring devices with changing Internet protocol (IP) addresses, comprising:

receiving SNMP trap from a remote device at a first IP address to notify that a connection is up;

in response to receiving the SNMP trap from the device, transmitting an SNMP poll to the device to obtain an identifier for the device;

corresponding the first IP address to the identifier for the device;

transmitting a sequence of SNMP GET requests at predetermined time periods to the device, wherein a corresponding sequence of SNMP GET responses are transmitted back from the device;

in response to failing to receive from the device a predetermined and tunable number of consecutive SNMP GET responses equal to a predetermined threshold, determining that there is a connection failure or a device failure;

in response to determining that there is the failure, checking whether the device is in a maintenance window; and in response to determining that there is the failure, waiting a predetermined and tunable window for the device to reconnect to a network and to send another SNMP trap from the device notifying that a connection is back up, wherein the device has a second IP address and the same identifier;

further comprising at least one of:

in response to determining that the device is in the maintenance window or is back up within the predetermined and tunable time window, generating no trouble ticket;

in response to determining that the device is not in the maintenance window and is not back up within the predetermined and tunable time window, generating a trouble ticket for the device; and in response to determining that the device having the same identifier is reconnected to the network within the predetermined and tunable time window, causing no trouble ticket to be generated.

2. The method of claim 1, wherein in response to failing to receive from the device the predetermined and tunable number of consecutive SNMP GET responses, recognizing a preliminary failure of the device.

3. The method of claim 1, further comprising:

recognizing that the same device is reconnected to the network by checking the identifier for the device received during the predetermined and tunable waiting window against the previous identifier for the device to determine that both are the same identifier;

recognizing that the first IP address of the device is different from the second IP address; and corresponding the identifier to the second IP address for the device.

4. The method of claim 1, wherein if a monitoring session is interrupted, the device is configured to notify a monitoring module that the connection is back up.

5. The method of claim 4, wherein the monitoring module represents a plurality of monitoring modules distributed across a network; and
wherein the plurality of monitoring modules are respectively responsible to monitor a plurality of devices.

6. The method of claim 4, wherein if any of the plurality of monitoring modules are down, backup monitoring modules are responsible to monitor the plurality of devices in place of any of the down plurality of monitoring modules.

7. A server for monitoring devices with changing Internet protocol (IP) addresses comprising:
memory for storing a program for monitoring devices with changing Internet protocol (IP) addresses; and
a processor, functionally coupled to the memory, the processor being responsive to computer-executable instructions contained in the program and operative to:
receive SNMP trap from a remote device at a first IP address to notify that a connection is up;
in response to receiving the SNMP trap from the device, transmit an SNMP poll to the device to obtain an identifier for the device;
correspond the first IP address to the identifier for the device;
transmit a sequence of SNMP GET requests at predetermined time periods to the device, wherein a corresponding sequence of SNMP GET responses are transmitted back from the device;
in response to failing to receive from the device a predetermined and tunable number of consecutive SNMP GET responses equal to a predetermined threshold, determine that there is a connection failure or a device failure;
in response to determining that there is the failure, check whether the device is in a maintenance window; and
in response to determining that there is the failure, wait a predetermined and tunable window for the device to reconnect to a network and to send another SNMP trap from the device notifying that a connection is back up, wherein the device has a second IP address and the same identifier;
wherein the processor is operative to at least one of:
in response to determining that the device is in the maintenance window or is back up within the predetermined and tunable time window, generate no trouble ticket;
in response to determining that the device is not in the maintenance window and is not back up within the predetermined and tunable time window, generate a trouble ticket for the device; and
in response to determining that the device having the same identifier is reconnected to the network within the predetermined and tunable window, cause no trouble ticket to be generated.

8. The server of claim 7, wherein in response to failing to receive from the device the predetermined and tunable number of consecutive SNMP GET responses, the processor is operative to recognize a preliminary failure of the device.

9. The server of claim 7, wherein the processor is operative to:
recognize that the same device is reconnected to the network by checking the identifier for the device received during the predetermined and tunable waiting window against the previous identifier for the device to determine that both are the same identifier;
recognize that the first IP address of the device is different from the second IP address; and
correspond the identifier to the second IP address for the device.

10. The server of claim 7, wherein if a monitoring session is interrupted, the device is configured to notify a monitoring module that the connection is back up.

11. The server of claim 10, wherein the monitoring module represents a plurality of monitoring modules distributed across a network; and
wherein the plurality of monitoring modules are respectively responsible to monitor a plurality of devices.

12. The server of claim 10, wherein if any of the plurality of monitoring modules are down, backup monitoring modules are responsible to monitor the plurality of devices in place of any of the down plurality of monitoring modules.

13. A non-transitory computer readable medium, including instructions for causing a computer to execute monitoring devices with changing Internet protocol (IP) addresses, comprising:
receiving SNMP trap from a remote device at a first IP address to notify that a connection is up;
in response to receiving the SNMP trap from the device, transmitting an SNMP poll to the device to obtain an identifier for the device;
corresponding the first IP address to the identifier for the device;
transmitting a sequence of SNMP GET requests at predetermined time periods to the device, wherein a corresponding sequence of SNMP GET responses are transmitted back from the device;
in response to failing to receive from the device a predetermined and tunable number of consecutive SNMP GET responses equal to a predetermined threshold, determining that there is a connection failure or a device failure;
in response to determining that there is the failure, checking whether the device is in a maintenance window; and
in response to determining that there is the failure, waiting a predetermined and tunable window for the device to reconnect to a network and to send another SNMP trap from the device notifying that a connection is back up, wherein the device has a second IP address and the same identifier
further comprising at least one of:
in response to determining that the device is in the maintenance window or is back up within the predetermined and tunable time window, generating no trouble ticket; and
in response to determining that the device is not in the maintenance window and is not back up within the predetermined and tunable time window, generating a trouble ticket for the device; and
in response to determining that the device having the same identifier is reconnected to the network within the predetermined and tunable window, causing no trouble ticket to be generated.

14. The computer program product of claim 13, wherein in response to failing to receive from the device the predetermined and tunable number of consecutive SNMP GET responses, recognizing a preliminary failure of the device.

15. The computer program product of claim 13, further comprising:
recognizing that the same device is reconnect to the network by checking the identifier for the device received during the predetermined and tunable waiting window against the previous identifier for the device to determine that both are the same identifier;

recognizing that the first IP address of the device is different from the second IP address; and corresponding the identifier to the second IP address for the device.

16. The computer program product of claim 13, wherein if a monitoring session is interrupted, the device is configured to notify a monitoring module that the connection is back up.

17. The computer program product of claim 16, wherein the monitoring module represents a plurality of monitoring modules distributed across a network; and wherein the plurality of monitoring modules are respectively responsible to monitor a plurality of devices.

* * * * *